United States Patent
Matsunaga

(10) Patent No.: US 9,503,326 B2
(45) Date of Patent: Nov. 22, 2016

(54) CONTROL APPARATUS AND CONTROL METHOD

(71) Applicant: Sony Corporation, Tokyo (JP)

(72) Inventor: Osamu Matsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 14/283,433

(22) Filed: May 21, 2014

(65) Prior Publication Data

US 2014/0355480 A1 Dec. 4, 2014

(30) Foreign Application Priority Data

Jun. 4, 2013 (JP) ................................. 2013-118207

(51) Int. Cl.
*H04L 12/24* (2006.01)
*H04L 12/46* (2006.01)
*H04L 12/64* (2006.01)

(52) U.S. Cl.
CPC ........... *H04L 41/12* (2013.01); *H04L 12/4641* (2013.01); *H04L 12/4675* (2013.01); *H04L 12/4679* (2013.01); *H04L 12/6418* (2013.01); *H04L 41/0813* (2013.01)

(58) Field of Classification Search
CPC .............. H04L 41/12; H04L 12/4675; H04L 12/4679; H04L 12/4641
See application file for complete search history.

(56) References Cited

U.S. PATENT DOCUMENTS

| | | | | |
|---|---|---|---|---|
| 5,825,772 A * | 10/1998 | Dobbins | ............. | H04L 12/1886 370/396 |
| 8,892,696 B1 * | 11/2014 | Thai | ....................... | H04L 41/12 370/254 |
| 2005/0091396 A1 * | 4/2005 | Nilakantan | ............. | H04L 45/04 709/232 |
| 2005/0169239 A1 * | 8/2005 | Knees | ................. | H04L 12/4641 370/351 |
| 2008/0165704 A1 * | 7/2008 | Marchetti | ........... | H04L 12/4641 370/256 |
| 2009/0049161 A1 * | 2/2009 | Takeuchi | ................ | H04L 12/24 709/222 |
| 2009/0304007 A1 * | 12/2009 | Tanaka | ................ | H04L 12/4645 370/395.53 |
| 2009/0316584 A1 * | 12/2009 | Tanaka | ................ | H04L 12/4675 370/238 |
| 2011/0075664 A1 * | 3/2011 | Lambeth | ................. | H04L 45/04 370/390 |
| 2011/0134793 A1 * | 6/2011 | Elsen | .................... | H04L 12/462 370/254 |
| 2014/0056298 A1 * | 2/2014 | Vobbilisetty | ............ | H04L 12/46 370/355 |
| 2014/0269742 A1 * | 9/2014 | Christenson | ............ | H04L 49/25 370/401 |

FOREIGN PATENT DOCUMENTS

JP       2003-158539       5/2003

* cited by examiner

*Primary Examiner* — Omer S Mian
(74) *Attorney, Agent, or Firm* — K&L Gates LLP

(57) ABSTRACT

There is provided a control apparatus including a setting unit configured to set a network configuration by assigning a network connection to between each of a plurality of network switches and each of a plurality of nodes based on disposition of the network switches and the nodes in a network having the network switches and the nodes, and a notification control unit configured to notify the network switches and the nodes of the set network configuration.

4 Claims, 11 Drawing Sheets

CONTROL APPARATUS AND CONTROL METHOD

CROSS REFERENCES TO RELATED APPLICATIONS

The present application claims priority to Japanese Priority Patent Application JP 2013-118207 filed in the Japan Patent Office on Jun. 4, 2013, the entire content of which is hereby incorporated by reference.

BACKGROUND

The present disclosure relates to a control apparatus and a control method.

Since the network resources are limited, effective use thereof is demanded. In response to such a demand, technologies to achieve effective use of network resources are being developed. The technologies to achieve effective use of network resources and quick recovery from a failure include the technology described in JP 2003-158539A, for example.

SUMMARY

For example, as a solution to achieve effective use of network resources and quick recovery from a failure, JP 2003-158539A discloses application of a plurality of VLANs (Virtual Local Area Networks) to a connection between nodes, configuring each of the VLANs with a network switch, and switching a failed VLAN to a backup VLAN for failure recovery. However, when the technology described in JP 2003-158539A is used, it is necessary to prepare a plurality of VLANs in which no loop path is created, and it is difficult to modify a network configuration without switching between the plurality of VLANs in which no loop path is created.

In the present disclosure, novel and improved control apparatus and control method are proposed, the control apparatus and control method being capable of achieving change in network configuration and reduction in consumption of network resources.

According to an embodiment of the present disclosure, there is provided a control apparatus including a setting unit configured to set a network configuration by assigning a network connection to between each of a plurality of network switches and each of a plurality of nodes based on disposition of the network switches and the nodes in a network having the network switches and the nodes, and a notification control unit configured to notify the network switches and the nodes of the set network configuration.

According to an embodiment of the present disclosure, there is provided a control method including setting a network configuration by assigning a network connection to between each of a plurality of network switches and each of a plurality of nodes based on disposition of the network switches and the nodes in a network having the network switches and the nodes, and notifying the network switches and the nodes of the set network configuration.

According to one or more embodiments of the present disclosure, change in network configuration and reduction in consumption of network resources can be achieved.

Additional features and advantages are described herein, and will be apparent from the following Detailed Description and the figures.

DETAILED DESCRIPTION

Hereinafter, a preferred embodiment of the present disclosure will be described in detail with reference to the accompanying drawings. In the present description and the drawings, components having substantially the same functional configuration are labeled with the same symbol and redundant description is omitted.

Hereinafter, description will be given in the following order. 1. Control Method according to Present Embodiment. 2. Control Apparatus according to Present Embodiment. 3. Program according to Present Embodiment.

Control Method According to Embodiment of Present Disclosure

First, a control method according to a present embodiment will be described, then the configuration of a control apparatus according to the present embodiment will be described. In the following, a control method according to the present embodiment will be described by way of example in which a control apparatus according to the present embodiment performs processing in the control method.

Summary of Control Method According to Present Embodiment

As described above, even when the technology described in JP 2003-158539A is used, for example, it is difficult to modify a network configuration without switching between the plurality of VLANs in which no loop path is created. Here, as a method of facilitating change in network configuration, for example, it is possible to adopt a method of incorporating a cross-point structure in the internal structure of VLANs which connect between nodes (each of which is a communication device that serves as a node, hereinafter such a communication device is simply referred to as a "node").

Figure 1:
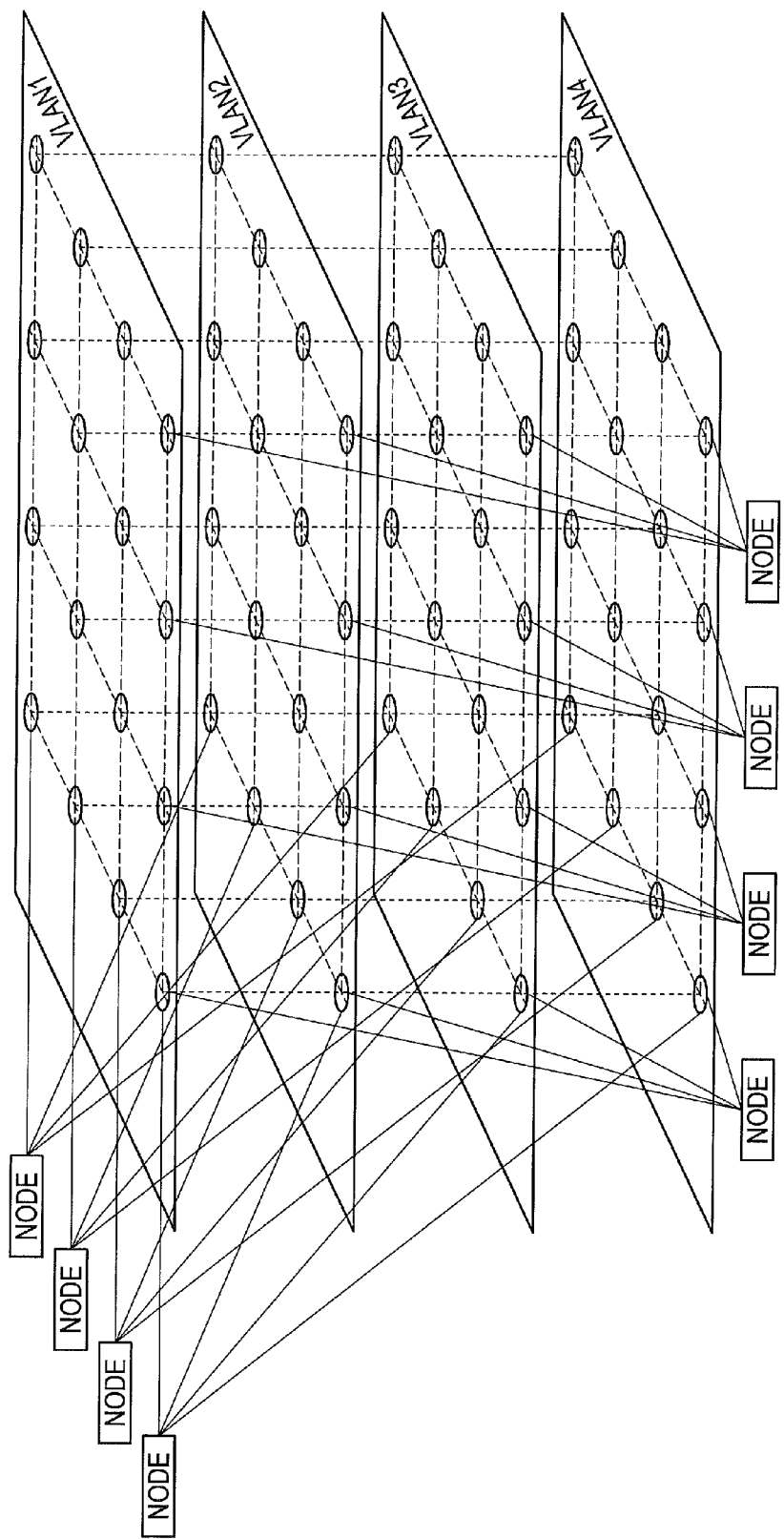
FIG. 1 is an explanatory diagram showing an example network configuration to which a method is applied, the method of incorporating a cross-point structure in the internal structure of VLANs which connect between nodes.

FIG. 1 is an explanatory diagram showing an example network configuration to which a method is applied, the method of incorporating a cross-point structure in the internal structure of VLANs which connect between nodes.

For example, in the network shown in FIG. 1, all applicable VLANs are stored for the connection between network switches and in the network switches. In addition, in the network as shown in FIG. 1 as one example, change in the position of a cross-point is achieved by notifying communication devices serving as nodes of a VLAN to be used without resetting the VLAN configuration of network switches by a control apparatus (not shown) which controls the entire network.

Thus, a predetermined cross-point structure may be achieved more easily, for example, by using a method of incorporating a cross-point structure in the internal structure of VLANs which connect between nodes, and thus change in network configuration may be made more easily.

However, in order to achieve a network configuration to which the incorporation method is applied for incorporating a cross-point structure in the internal structure of VLANs which connect between nodes as shown in FIG. 1 as one example, it is necessary to store all VLANs for all the connections between the network switches. Therefore, when a network configuration is achieved to which the incorporation method is applied for incorporating a cross-point structure in the internal structure of VLANs which connect between nodes as shown in FIG. 1 as one example, a VLAN may be present which is not used for communication in the connections between the network switches.

Consequently, when a network configuration is achieved to which the incorporation method is applied for incorporating a cross-point structure in the internal structure of VLANs which connect between nodes as shown in FIG. 1 as one example, an excessive number of ports and an excessive band, which are switch resources (example network resources), may be consumed. Here, as one example, the number of ports according to the present embodiment indicates the number of interfaces belonging to a network switch.

Thus, the control method according to the present embodiment achieves change in network configuration and reduction in consumption of network resources by reducing the network resources which may be consumed excessively when the incorporation method is applied for incorporating a cross-point structure in the internal structure of VLANs which connect between nodes. Also, a cross-point operating environment having a switch configuration with a smaller size is achieved by reducing the network resources which may be consumed excessively when the incorporation method is used for incorporating a cross-point structure in the internal structure of VLANs which connect between nodes.

The control apparatus according to the present embodiment achieves change in network configuration and reduction in consumption of network resources by performing, for example, the below-described set processing and notification control processing as the processing in the control method according to the present embodiment.

(1) Set Processing

The control apparatus according to the present embodiment sets a network configuration, for example in a network having a plurality of network switches and a plurality of nodes by assigning a network connection to between each of the network switches and each of the nodes. The control apparatus according to the present embodiment assigns a network connection to between each network switch and each node based on the disposition of the network switches and nodes in a network, for example.

Figure 2:
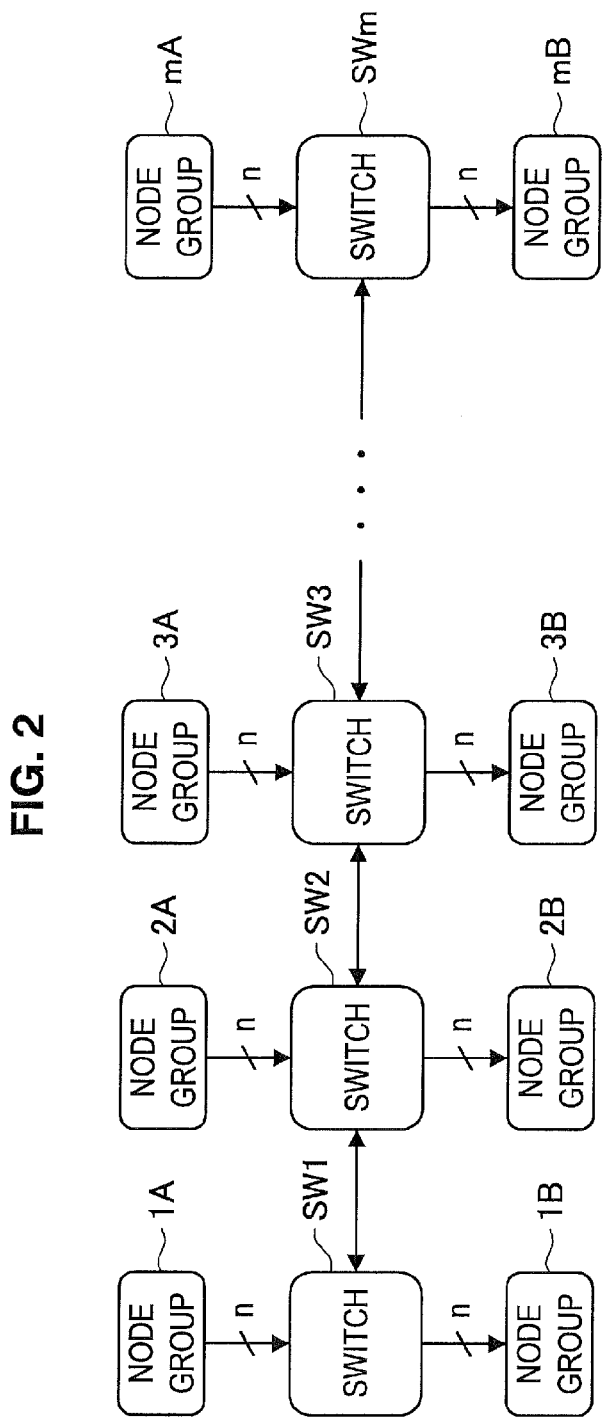
FIG. 2 is an explanatory diagram showing example processing in a control method according to an embodiment of the present disclosure.

FIG. 2 is an explanatory diagram showing example processing in the control method according to the present embodiment, and depicts an example network having a plurality of network switches and a plurality of nodes. In FIG. 2, each network switch is referred to as a "switch".

In the network shown in FIG. 2, m pieces (m is a positive integer) of network switches SW1 to SWm are connected in series. In each network switch SWm, node group mA and node group mB, which are n×2 pieces (n is a positive integer) of communication devices, are stored. FIG. 2 shows an example in which communication is made from node A to node B in a network, the node A including the nodes 1A to mA, the node B including the nodes 1B to mB.

The network shown in FIG. 2 will be taken as one example to describe the difference in the consumption of switch resources between the case where the incorporation method is used for incorporating a cross-point structure in the internal structure of VLANs which connect between nodes, and the case where the control method according to the present embodiment is used.

Figure 3:
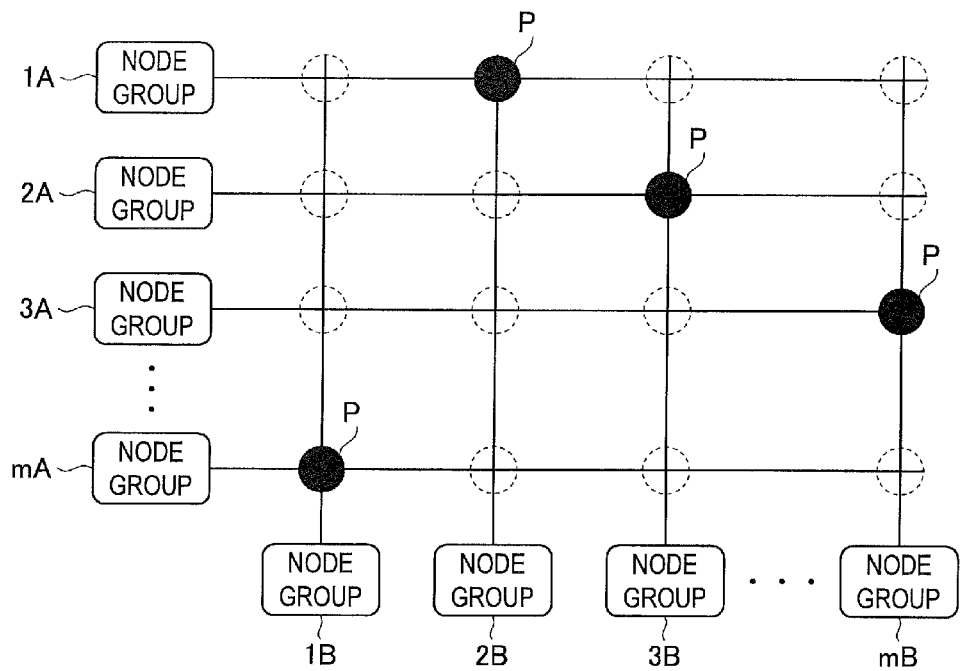
FIG. 3 is an explanatory diagram showing example processing in the control method according to an embodiment of the present disclosure.

FIG. 3 is an explanatory diagram showing example processing in the control method according to the present embodiment. Here, FIG. 3 shows an example network configuration to which the incorporation method is applied for incorporating a cross-point structure in the internal structure of VLANs which connect between nodes in the network shown in FIG. 2. That is, FIG. 3 shows an example cross-point structure in the case where all VLANs are stored for all the connections between the network switches.

Each P in FIG. 3 shows a connection point and indicates that communication can be made, for example, between the node group mA and the node group mB connected via a connection point (for example, between the node group 1A and the node group 2B). Also, the lines shown as solid lines in FIG. 3 each indicates a connection line. That is, FIG. 3 shows the manner in which a network switch, which does not store the node group mA and the node group mB that allow mutual communication in FIG. 3, also stores a VLAN assigned to the node group mA and the node group mB, the network switch being such a network switch which does not store the node group 1A and the node group 2B, for example.

As shown in FIG. 3 as one example, in the case where the incorporation method is used for incorporating a cross-point structure in the internal structure of VLANs which connect between nodes, a network switch, which does not store the node group mA and the node group mB that allow mutual communication, may store a VLAN assigned to the node group mA and the node group mB. Therefore, in the case where the incorporation method is used for incorporating a cross-point structure in the internal structure of VLANs which connect between nodes, an excessive number of ports and an excessive band, which are switch resources (example network resources), may be consumed.

Figure 4:
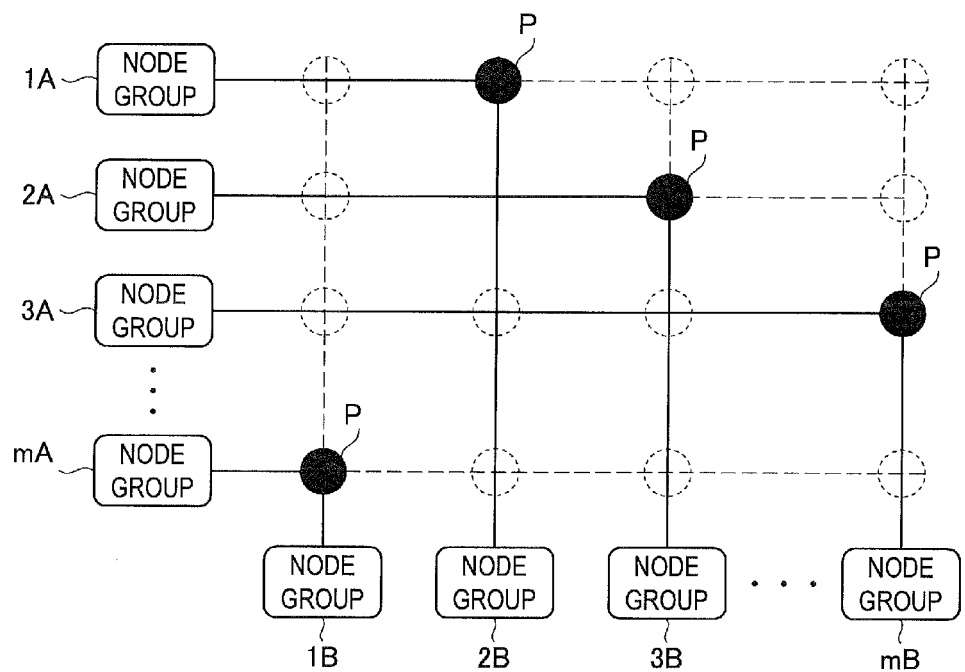
FIG. 4 is an explanatory diagram showing example processing in the control method according to an embodiment of the present disclosure.

FIG. 4 is an explanatory diagram showing example processing in the control method according to the present embodiment. Here, FIG. 4 shows an example network configuration to which the control method according to the present embodiment is applied in the network shown in FIG. 2.

Each P in FIG. 4 shows a connection point and indicates that communication can be made, for example, between the node group mA and the node group mB connected via a connection point (for example, between the node group 1A and the node group 2B). Also, the lines shown as solid lines in FIG. 4 each indicates a connection line.

The control apparatus according to the present embodiment sets a network configuration by assigning a network connection to between each network switch and each node in set processing according to the present embodiment. Thus, when the control method according to the present embodiment is used, a network switch, which does not store the node group mA and the node group mB that allow mutual communication, does not store a VLAN assigned to the node group mA and the node group mB, the network switch being such a network switch which does not store the node group 1A and the node group 2B as shown in FIG. 4 as one example. That is, when the control method according to the present embodiment is used, in addition to the incorporation of a cross-point structure similar to that in FIG. 3, any connection line other than the connection line (that is, unnecessary connection line) between the node group mA and the node group mB to be mutually communicated is not assigned as shown by a dashed line of FIG. 4.

Therefore, the control apparatus according to the present embodiment, which performs the processing in the control method according to the present embodiment, can achieve change in network configuration and reduction in consumption of network resources by forming a cross-point structure without assigning a network to each network switch, the network corresponding to unnecessary connection line.

(2) Notification Control Processing

The control apparatus according to the present embodiment notifies a plurality of network switches and a plurality of nodes of a set network configuration, for example. Here, the control apparatus according to the present embodiment transmits information (data) indicating the set network configuration, for example, via a communication unit (described later) included in the control apparatus according to the present embodiment, or via an external communication device connected to the control apparatus according to the present embodiment.

The control apparatus according to the present embodiment performs, as one example the above-described set processing and the above-described notification control processing as the processing in the control method according to the present embodiment.

Processing in Control Method According to Present Embodiment

Hereinafter, example processing in the control method according to the present embodiment will be described more specifically.

Note that although the case where the control apparatus according to the present embodiment performs assignment of a VLAN in a Layer 2 switch network will be taken as one example to describe example processing in the control method according to the present embodiment below, the processing in the control method according to the present embodiment is not limited to the above-mentioned processing. For example, the control apparatus according to the present embodiment can achieve network assignment in a Layer 3 switch network by the processing similar to the below-described VLAN assignment in a Layer 2 switch network.

Figure 5:
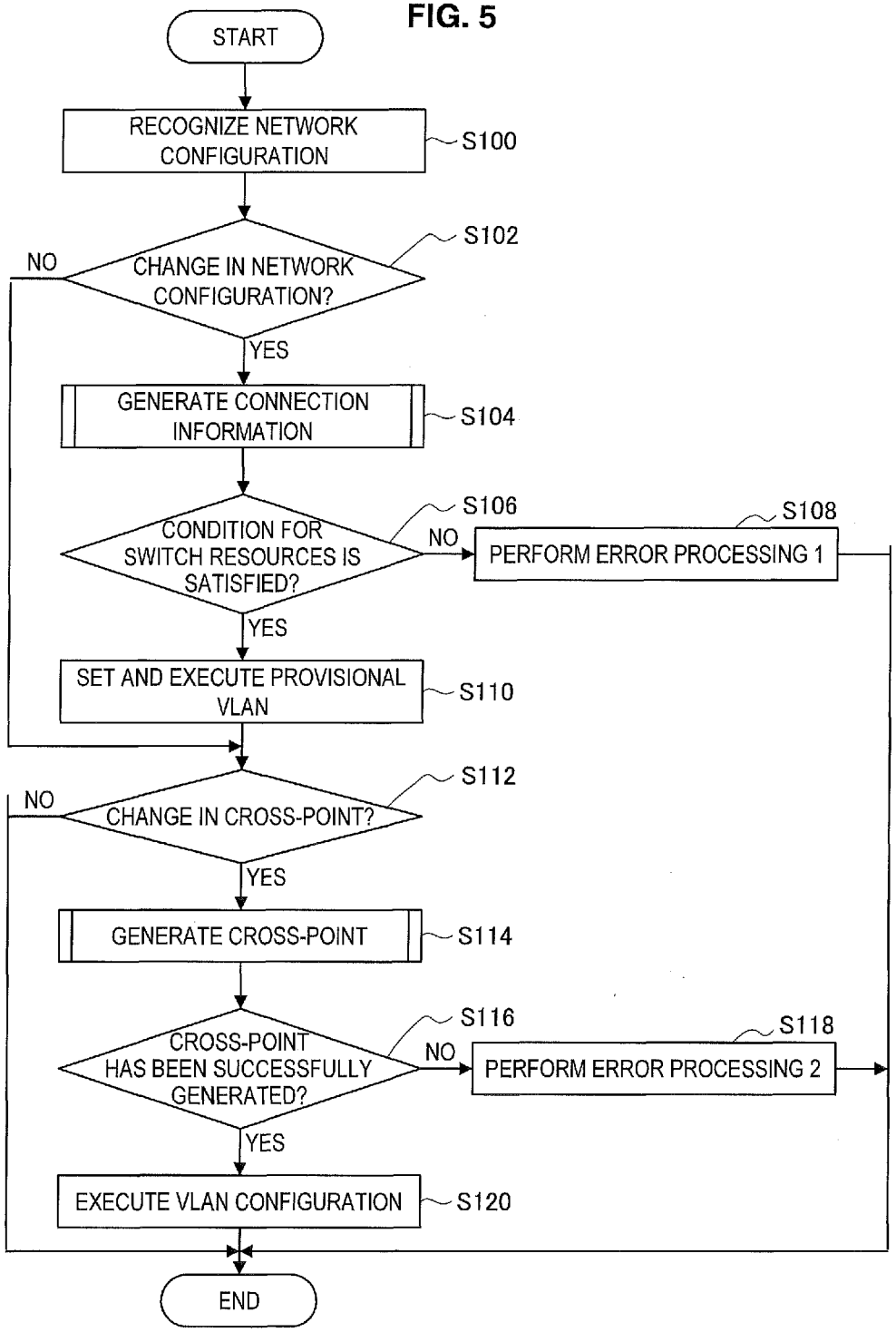
FIG. 5 is a flow chart showing example processing in the control method according to an embodiment of the present disclosure.

FIG. 5 is a flow chart showing example processing in the control method according to the present embodiment. Here, the processing of steps S100 to S120 (part of processing of step S104, S114) shown in FIG. 5 corresponds to the set processing according to the present embodiment. Also, part of the processing of step S104, S114 shown in FIG. 5 corresponds to the notification control processing according to the present embodiment. The details of the processing of step S104 will be described later with reference to FIG. 6. Also, the details of the processing of step S114 will be described later with reference to FIG. 10.

The control apparatus according to the present embodiment recognizes a network configuration (network topology) (S100). The control apparatus according to the present embodiment recognizes a network configuration by using any method capable of recognizing a network configuration, for example, a method of using a response signal to a transmitted signal.

The control apparatus according to the present embodiment determines whether or not a change is made to the network configuration (S102). Here, the case where a change is made to the network configuration refers to an event that a change is made to a connection, for example, between network switches and/or between a network switch and an end point. Also, cases where a change is made to the network configuration include the case where an increase or decrease in the number of nodes occurs, for example, the case where a new communication device is added to the network, and the case where a communication device is no longer associated with the network.

When it is determined in step S102 that no change has been made to the network configuration, the control apparatus according to the present embodiment performs the processing starting from later-described step S112.

Otherwise, when it is determined in step S102 that a change has been made to the network configuration, the control apparatus according to the present embodiment generates connection information (S104). Here, the generation of connection information according to the present embodiment refers to calculation of the number of ports and the number of VLANs applicable to the network switches included in the network based on the information indicating the network configuration (the information (data) indicating the disposition of network switches and nodes).

Figure 6:
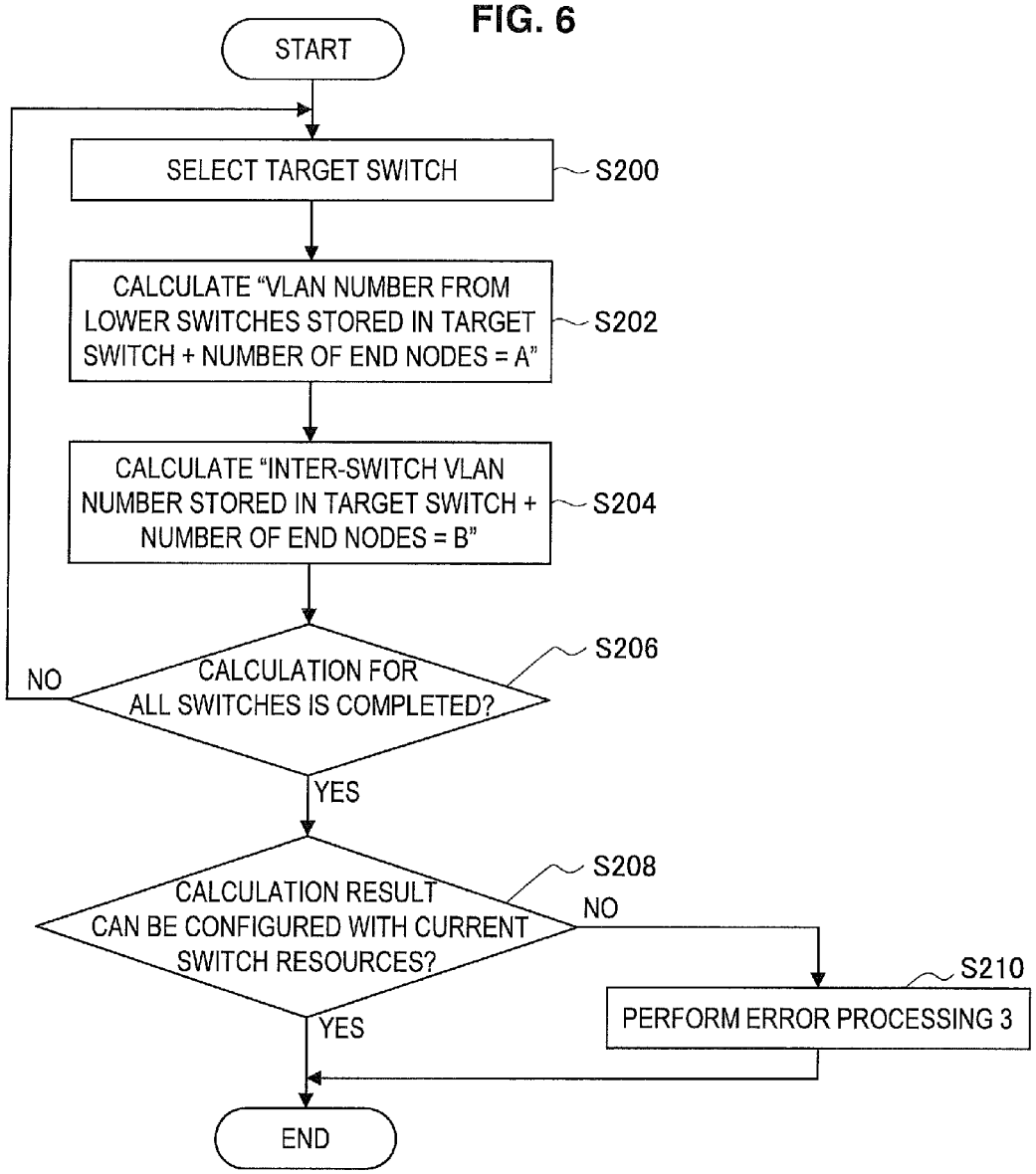
FIG. 6 is a flow chart showing example processing of generating connection information according to an embodiment of the present disclosure.

Example Processing of Generating Connection Information According to Present Embodiment FIG. 6 is a flow chart showing example processing of generating connection information according to the present embodiment. Here, the connection information generation processing shown in FIG. 6 refers to processing for establishing connection of Layers 1, 2 which are commensurate with the type and disposition of the network switches to be used and the number of end nodes stored in each network switch. Also, FIG. 6 shows an example which uses a method of determining connection information on all switches as the sum of connection information on each network switch. Also, in FIG. 6, a network switch included in a network is referred to as a "switch".

The control apparatus according to the present embodiment selects a target network switch (hereinafter may be referred to as a "target switch") to be processed (S200).

Figure 7:
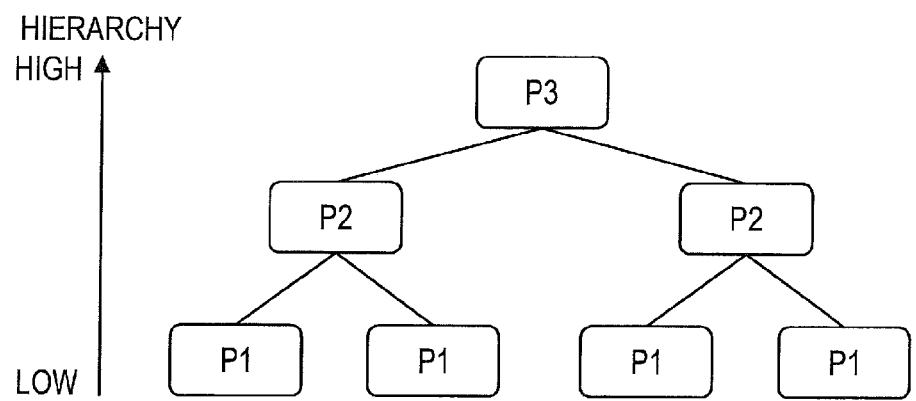
FIG. 7 is an explanatory diagram showing an example method of selecting a network switch to be processed in the processing of generating connection information according to an embodiment of the present disclosure.
Figure 8:
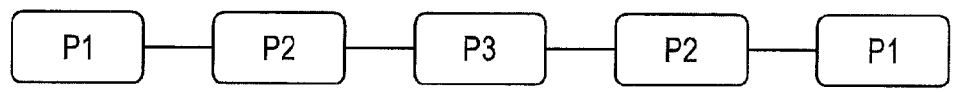
FIG. 8 is an explanatory diagram showing an example method of selecting a network switch to be processed in the processing of generating connection information according to an embodiment of the present disclosure.

FIGS. 7 and 8 are each an explanatory diagram showing an example method of selecting a network switch to be processed in the connection information generation processing according to the present embodiment.

When a hierarchy is defined for each network switch disposed in a network as shown in FIG. 7 as one example, the control apparatus according to the present embodiment selects network switches in ascending order of the hierarchy of the network switches. In the example shown in FIG. 7, network switches are selected in the order of P1, P2, and P3. That is, as shown in FIG. 7 as one example, when a hierarchy is defined for each network switch disposed in a network, the control apparatus according to the present embodiment calculates the number of network connections (as examples, the number of ports and the number of VLANs applicable to the network switches) to be assigned to nodes in ascending order of the hierarchy of the network switches, for example.

As shown in FIG. 8 as one example, when no hierarchy is defined for any network switch disposed in a network, the control apparatus according to the present embodiment selects network switches sequentially starting from a network switch located at one end. In the example shown in FIG. 8, network switches are selected in the order of P1, P2, and P3. That is, as shown in FIG. 8 as one example, when no hierarchy is defined for any network switch disposed in a network, the control apparatus according to the present embodiment calculates the number of network connections (as examples, the number of ports and the number of VLANs applicable to the network switches) to be assigned to nodes sequentially starting from a network switch located at one end, for example.

Referring again to FIG. 6, example connection information generation processing according to the present embodiment will be described. The control apparatus according to the present embodiment calculates the number of connections (hereinafter referred to as a "VLAN number") via Layer 2 between switches stored in a target switch (S202). In step S202, the control apparatus according to the present embodiment performs, for example, the arithmetic shown in Expression 1 below. Here, a lower switch shown in Expression 1 refers to a network switch which is lower in the hierarchy or located closer to an end with respect to the target switch, for example. Hereinafter, a network switch which is higher in the hierarchy or located more away from an end with respect to the target switch may be referred to as a "higher switch".

$$A = \text{VLAN number from the lower switches stored in the target switch} + \text{the number of end nodes} \quad \text{(Expression 1)}$$

More specifically, the inter-network switch VLAN number between the target switch and adjacent upper switches applicable to the target switch is determined by the VLAN number from the lower switches adjacent to the target switch and a VLAN number which is a value converted from the number of end nodes stored in the target switch. When the target switch is a network switch located in the lowest, the VLAN number from the lower switches is 0 (zero). The VLAN number stored in the target switch is the number obtained by adding a VLAN number to the sum of the VLAN numbers from the lower switches and to the upper switches, the VLAN number being a value converted from the number of end nodes stored in the target switch. A VLAN number according to the present embodiment has a relationship with the maximum switching capacity in a network switch, for example.

The control apparatus according to the present embodiment calculates the number of ports which is stored in the target switch (S204). The control apparatus according to the present embodiment performs, for example, the arithmetic shown in Expression 2 in step S204.

$$B = \text{inter-switch VLAN number stored in the target switch} + \text{the number of end nodes} \quad \text{(Expression 2)}$$

More specifically, the number of ports stored in the target switch is the number obtained by adding the number of end nodes stored in the target switch to the value which is the number of ports converted from the sum of the VLAN numbers from the lower switches and to the upper switches.

Note that although description has been given in the above by assuming that the VLAN number=the number of ports in the conversion from the VLAN number used for connection between switches to the number of ports, the method for conversion between VLAN number and the number of ports according to the present embodiment is not limited the above method. For example, the control apparatus according to the present embodiment may use a method of storing a plurality of VLANs via Layer 2 connection in one port based on throughput information which is separately defined and indicates a communication throughput for each VLAN. Also, in a network switch having a plurality of ports with different link speeds, it is common to perform assignment of a high-speed port by a connection between network switches. When a high-speed port is assigned by a connection between network switches, the control apparatus according to the present embodiment may also use a method of converting ten 1 [Gbps] ports to one 10 [Gbps] port, for example.

When the processing of step S202, S204 is completed, the control apparatus according to the present embodiment determines whether or not calculation for all switches included in the network is completed (S206). The control apparatus according to the present embodiment determines that calculation for all switches included in the network is completed when each of the switches in the network has been processed as a target switch. Here, when calculation for all switches in the network is completed, data indicating a result of the calculation corresponds to the connection information according to the present embodiment.

When it is determined in step S206 that calculation for all switches in the network is not completed, the control apparatus according to the present embodiment repeats the processing starting from step S200.

Otherwise, when it is determined in step S206 that calculation for all switches in the network is completed, the control apparatus according to the present embodiment determines whether or not the calculation result can be configured with the current switch resources in the network (S208).

When it is determined in step S208 that the calculation result may not be configured with the current switch resources in the network, the control apparatus according to the present embodiment performs error processing 3 (S210). The control apparatus according to the present embodiment then terminates the connection information generation processing according to the present embodiment.

Here, the error processing 3 includes, for example, processing of recording what type of error. The control apparatus according to the present embodiment stores, for example, "an amount of shortage of the VLAN number in the current switch resources with respect to the number of VLANs stored in each network switch calculated in step S202 (which network switch has a shortage of how much VLAN number)", or "an amount of shortage of the number of ports in the current switch resources with respect to the number of ports stored in each network switch calculated in step S204 (which network switch has a shortage of how many ports)" into a storage medium such as a storage unit (described later). The information stored in step S210 is referred to, for example, in the processing (which will be described later) of step S106 shown in FIG. 5.

When it is determined in step S208 that the calculation result can be configured with the current switch resources in the network, the control apparatus according to the present embodiment terminates the connection information generation processing according to the present embodiment.

In step S104 shown in FIG. 5, the control apparatus according to the present embodiment performs the processing shown in FIG. 6 as one example. Note that it should be obvious that the connection information generation processing according to the present embodiment is not limited to the processing shown in FIG. 6.

Referring again to FIG. 5, example processing in the control method according to the present embodiment will be described. When connection information is generated in step S104, the control apparatus according to the present embodiment determines whether or not the generated connection information satisfies the condition for the switch resources (S106). Here, the processing in step S106 is, for example, determining whether or not the sum of the number of ports and the number of VLANs exceeds the upper limit of the number of connections achievable by the current switch resources, the sum being indicated by the connection information and applicable to the network switches included in the network.

As described above, as one example the number of ports according to the present embodiment indicates the number of interfaces of a network switch, and a VLAN number according to the present embodiment has a relationship with the maximum switching capacity in the network switch. Thus, when the determination of step S106 is made, feasibility/no feasibility of a network configuration is determined, for example, by two determination criteria: the maximum switching capacity and the number of interfaces in the network switch.

In step S106, when it is determined that the condition for the switch resources is not satisfied, the control apparatus according to the present embodiment performs error processing 1 (S108). The control apparatus according to the present embodiment then terminates the processing in the control method according to the present embodiment.

Here, the error processing 1 according to the present embodiment is performed in the case where the sum of the number of ports and the number of VLANs exceeds the upper limit of the number of connections achievable by the current switch resources, the number of ports and the number of VLANs being indicated by the connection information and applicable to the network switches included in the network. In the above-described case, a network configuration is desirably changed again by adopting a coping strategy, for example, replacing the current network switch with a network switch having an increased number of ports, or increasing the number of network switches.

Thus, the error processing 1 according to the present embodiment is, for example, processing of notifying a user of desirable change in the configuration of the network switch, the user being of the control apparatus according to the present embodiment. As the error processing 1 according to the present embodiment, the control apparatus according to the present embodiment may notify a user of a change command for a network configuration, the change command including selectable proposals for change, for example, "addition of a device to the node group 2A shown in FIG. 2 is possible although addition of a device to the node group 1A in FIG. 2 is not possible", the user being of the control apparatus according to the present embodiment. The control apparatus according to the present embodiment notifies a user, for example, by a visual notification method using characters, images, or light of an indicator lamp, or by an audio informing method using sound (also including music).

In the case where the error processing 1 according to the present embodiment is performed, the network configuration is changed, for example, based on the above-mentioned change command for the network configuration, then the processing starting from step S100 is performed again.

In step S106, when it is determined that the condition for the switch resources is satisfied, the control apparatus according to the present embodiment sets a provisional VLAN for a connection to be changed based on the connection information, and executes the set provisional VLAN (S110). The control apparatus according to the present embodiment sets a VLAN (network) according to the set network configuration as a provisional VLAN (provisional network) in the set processing according to the present embodiment. The control apparatus according to the present embodiment then executes the set provisional VLAN by transmitting information to the plurality of network switches and the plurality of nodes in the notification control processing according to the present embodiment, the information indicating the set network configuration.

The control apparatus according to the present embodiment sets a provisional VLAN and executes the set provisional VLAN in step S110, and thus it can be checked that communication is made possible by the provisional VLAN, for example.

FIG. 5 shows an example in which the control apparatus according to the present embodiment sets a provisional VLAN and executes the set provisional VLAN in step S110. However, the processing in the control method according to the present embodiment is not limited to the above-described example. For example, the control apparatus according to the present embodiment is capable of recognizing a connection to be changed based on the connection information, and thus may shut down part or all of the devices included in the network without performing the processing of step S110.

Figure 9:
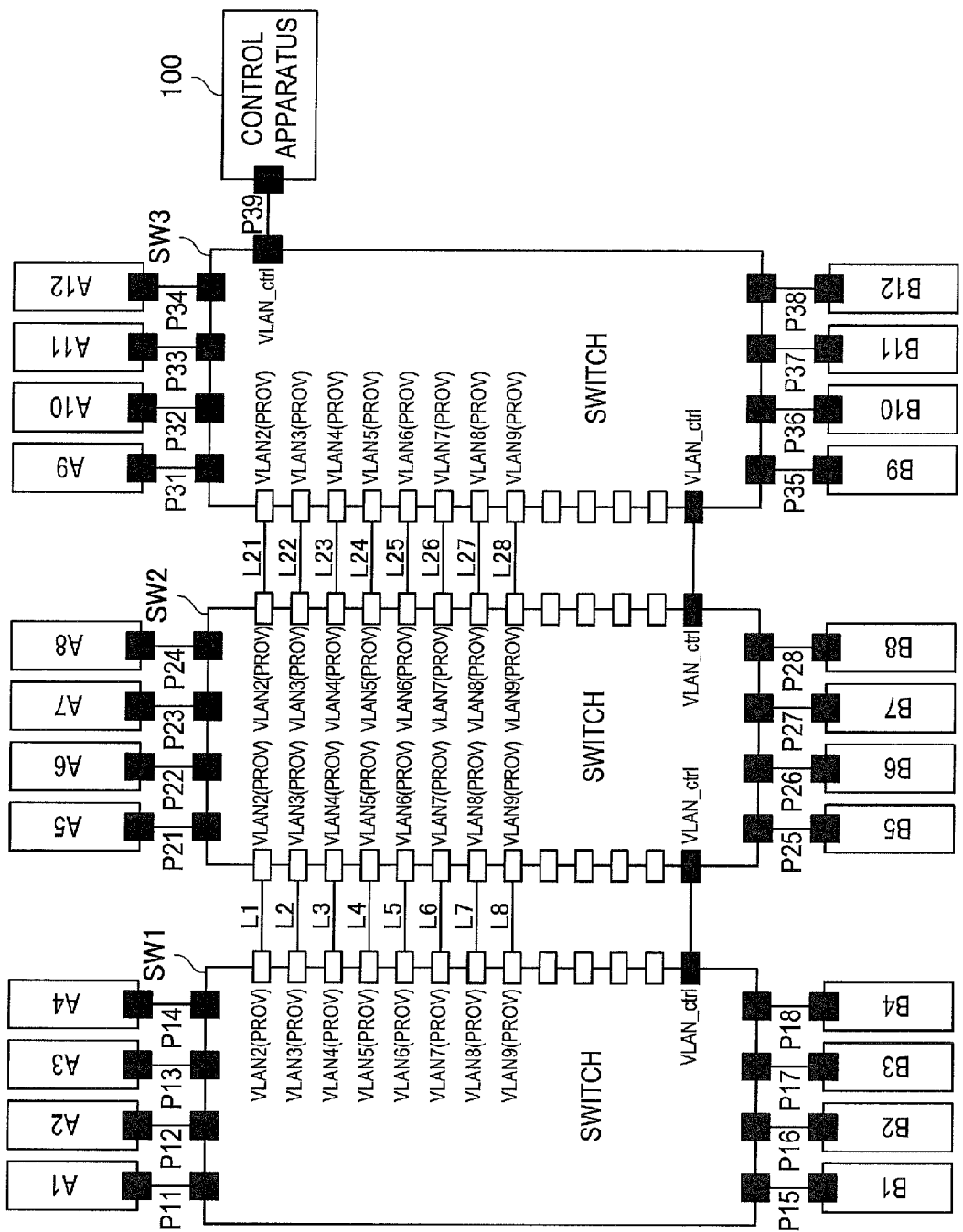
FIG. 9 is an explanatory diagram showing an example state in which provisional VLANs are assigned in a network according to an embodiment of the present disclosure.

FIG. 9 is an explanatory diagram showing an example state in which provisional VLANs are assigned in a network according to the present embodiment. Here, as one example network according to the present embodiment, FIG. 9 shows a network including a control apparatus 100, network switches SW1, SW2, SW3, nodes A1 to A12, and nodes B1 to B12. Hereinafter, the nodes A1 to A12 and the nodes B1 to B12 may be collectively referred to as "end nodes".

In a state in which the provisional VLANs are assigned as shown in FIG. 9, each VLAN for control (VLAN_ctrl shown in FIG. 9) is just assigned for connection of the end nodes, and any VLAN for communication is not assigned yet. Also, in a state in which the provisional VLANs are assigned as shown in FIG. 9, in addition to each VLAN for control (VLAN_ctrl shown in FIG. 9), provisional VLANs are assigned for the connection between network switches.

Referring again to FIG. 5, example processing in the control method according to the present embodiment will be described. When it is determined in step S102 that a change has been made to the network configuration or the processing of step S110 has been performed, the control apparatus according to the present embodiment determines whether or not a change has been made to the cross-point (S112). The control apparatus according to the present embodiment determines that a change has been made to the cross-point, for example, when a change has been made to the connection relationship between the end nodes.

When it is determined in step S112 that no change has been made to the cross-point, the control apparatus according to the present embodiment generates a cross-point (S114).

Example Processing of Generating Cross-Point According to Present Embodiment

Figure 10:
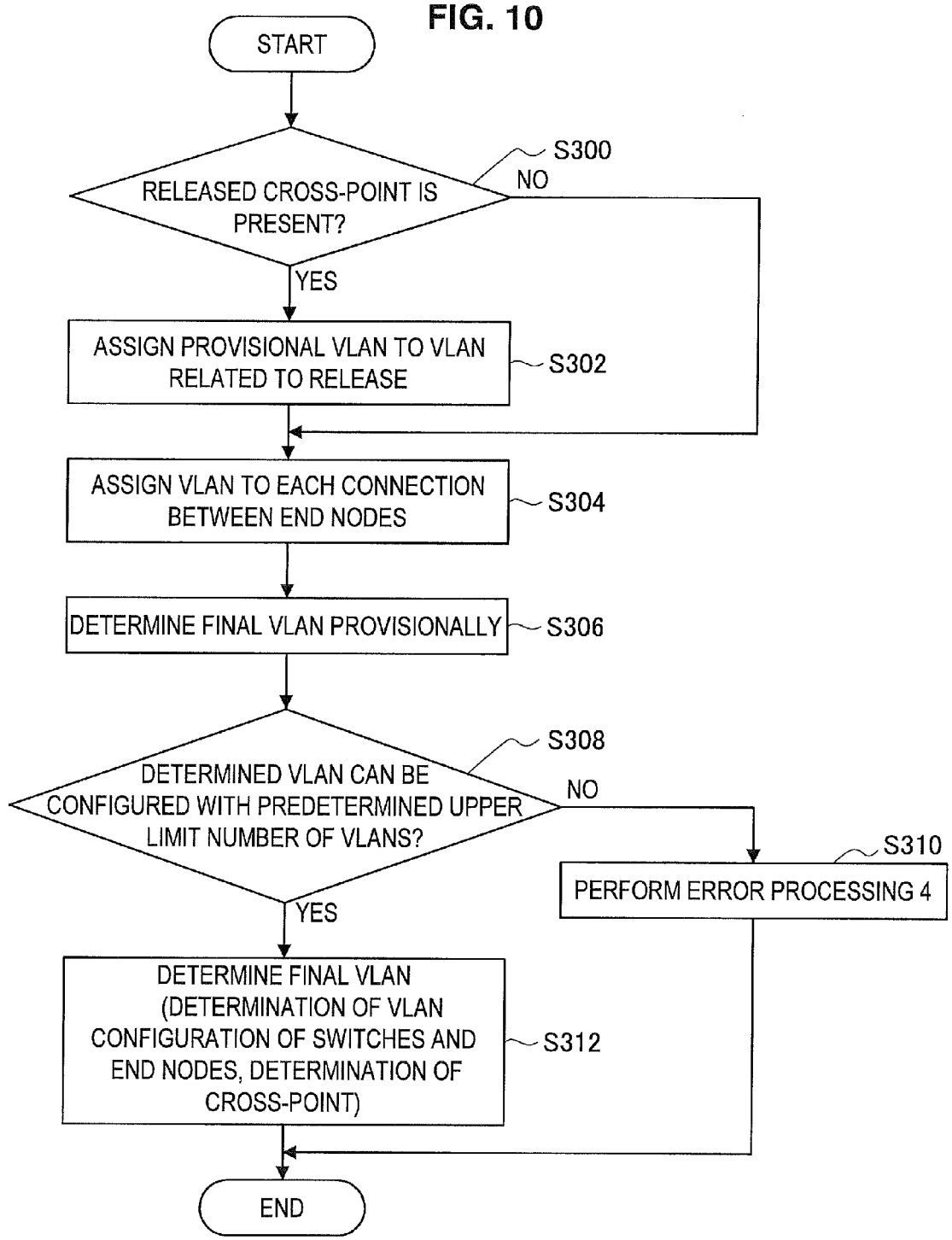
FIG. 10 is a flow chart showing example processing of generating a cross-point according to an embodiment of the present disclosure.

FIG. 10 is a flow chart showing example processing of generating a cross-point according to the present embodiment. The cross-point generation processing shown in FIG. 10 refers to, for example, processing of setting VLANs to be used for the network switches and the end nodes in order to achieve a predetermined cross-point. Also, in FIG. 10, a network switch is referred to as a "switch".

The control apparatus according to the present embodiment determines whether or not a released cross-point is present (S300).

When it is determined in step S300 that no released cross-point is present, the control apparatus according to the present embodiment performs the processing starting from below-described step S304.

Otherwise, when it is determined in step S300 that a released cross-point is present, the control apparatus according to the present embodiment assigns a provisional VLAN to a VLAN related to the release (S302). Here, the processing of step S302 refers to processing of restoring a release-related VLAN to a provisional VLAN.

When it is determined in step S300 that no released cross-point is present or when the processing of step S302 is performed, the control apparatus according to the present embodiment performs assignment of a VLAN for each connection between the end nodes (S304). Here, the processing of step S304 refers to processing of performing provisional assignment of applicable VLANs for generating a predetermined cross-point.

When the processing of step S304 is performed, the control apparatus according to the present embodiment provisionally determines the configuration according to the assigned VLAN to be a final VLAN (S306).

When a final VLAN is provisionally determined in step S306, the control apparatus according to the present embodiment determines whether or not the provisionally determined final VLAN can be configured with a predetermined upper limit number of VLANs (S308). The control apparatus according to the present embodiment determines that the provisionally determined final VLAN can be configured, for example when the predetermined upper limit number falls within a range of connection information corresponding to provisional VLANs which have been already assigned as usable VLANs.

When it is determined in step S308 that the provisionally determined final VLAN may not be configured, the control apparatus according to the present embodiment performs error processing 4 (S310). The control apparatus according to the present embodiment then terminates the cross-point generation processing according to the present embodiment.

Here, the error processing 4 according to the present embodiment is, for example, processing of recording what type of error. The control apparatus according to the present embodiment stores, for example, an amount of shortage of VLAN number into a storage medium such as a storage unit (described later). Here, the information recorded in the error processing 4 in step S310 is referred to, for example, in below-described step S116 shown in FIG. 5.

When it is determined in step S308 that the provisionally determined final VLAN can be configured, the control apparatus according to the present embodiment determines that the provisionally determined final VLAN in step S306 is a final VLAN (S312). A cross-point is generated by performing the processing of step S312. Note that the configuration according to the final VLAN determined in step S312 refers to a configuration based on the calculation.

When a final VLAN is determined in step S312, the control apparatus according to the present embodiment terminates the cross-point generation processing according to the present embodiment.

In step S114 shown in FIG. 5, the control apparatus according to the present embodiment performs, for example, the processing shown in FIG. 10. In the processing shown in FIG. 10 as one example, a provisional VLAN is assigned to each of VLANs which are, for example, released along with the cross-point release or are left unused, and a new cross-point is attempted to be generated in the range of the provisional VLANs. Note that it should be obvious that the cross-point generation processing according to the present embodiment is not limited to the processing shown in FIG. 10.

Referring again to FIG. 5, example processing in the control method according to the present embodiment will be described. When a cross-point is generated in step S114, the control apparatus according to the present embodiment determines whether or not the cross-point has been successfully generated (S116). The control apparatus according to the present embodiment determines that the cross-point has been successfully generated, for example when it is confirmed that a new cross-point has been successfully generated in the range of the current connection information (the connection information generated in step S104).

When it is determined in step S116 that the cross-point has not been successfully generated, the control apparatus according to the present embodiment performs error processing 2 (S118). The control apparatus according to the present embodiment then terminates the processing in the control method according to the present embodiment.

Here, the error processing 2 according to the present embodiment refers to processing in which a cross-point may be able to be generated with the current switch resources, but generation of a cross-point is failed in the range of the current connection information. Also, in the case where the error processing 2 according to the present embodiment is performed, many additional connections between switches are desirably provided to generate, for example, a new cross-point.

Thus, the error processing 2 according to the present embodiment is, for example, processing of notifying a user of desirable change in the network configuration, the user being of the control apparatus according to the present embodiment. Also, when a cross-point can be generated with the current switch resources, the control apparatus according to the present embodiment may notify a user of a change command for a network configuration as the error processing 2 according to the present embodiment, the change command including selectable proposals for change, for example, "a cross-point can be generated when the number of connections between the switch SW1 and the switch SW2 shown in FIG. 2 is increased", the user being of the control apparatus according to the present embodiment.

In the case where the error processing 2 according to the present embodiment is performed, the network configuration is changed, for example, based on the above-mentioned change command for the network configuration, and then the processing starting from step S100 is performed again.

When it is determined in step S116 that the cross-point has been successfully generated, the control apparatus according to the present embodiment executes VLAN configuration (S120). That is, after the network configuration is finalized in the set processing according to the present embodiment, the control apparatus according to the present embodiment sets a VLAN (network) according to the network configuration as a final VLAN (final network). The control apparatus according to the present embodiment then executes the VLAN configuration by transmitting information to the plurality of network switches and the plurality of nodes in the notification control processing according to the present embodiment, the information indicating the set network configuration.

More specifically, the control apparatus according to the present embodiment shuts down, for example, relevant ports, rewrites the configuration file for the switch and notifies the end nodes of a VLAN to be used using the VLAN for control (as one example, VLAN_ctrl shown in FIG. 9). The control apparatus according to the present embodiment then releases the shutdown after rewriting the configuration file, for example. Note that a communication protocol used for executing the VLAN configuration according to the present embodiment is not limited to the above-mentioned VLAN for control, and, for example, any communication protocol may be used for the control apparatus according to the present embodiment.

Figure 11:
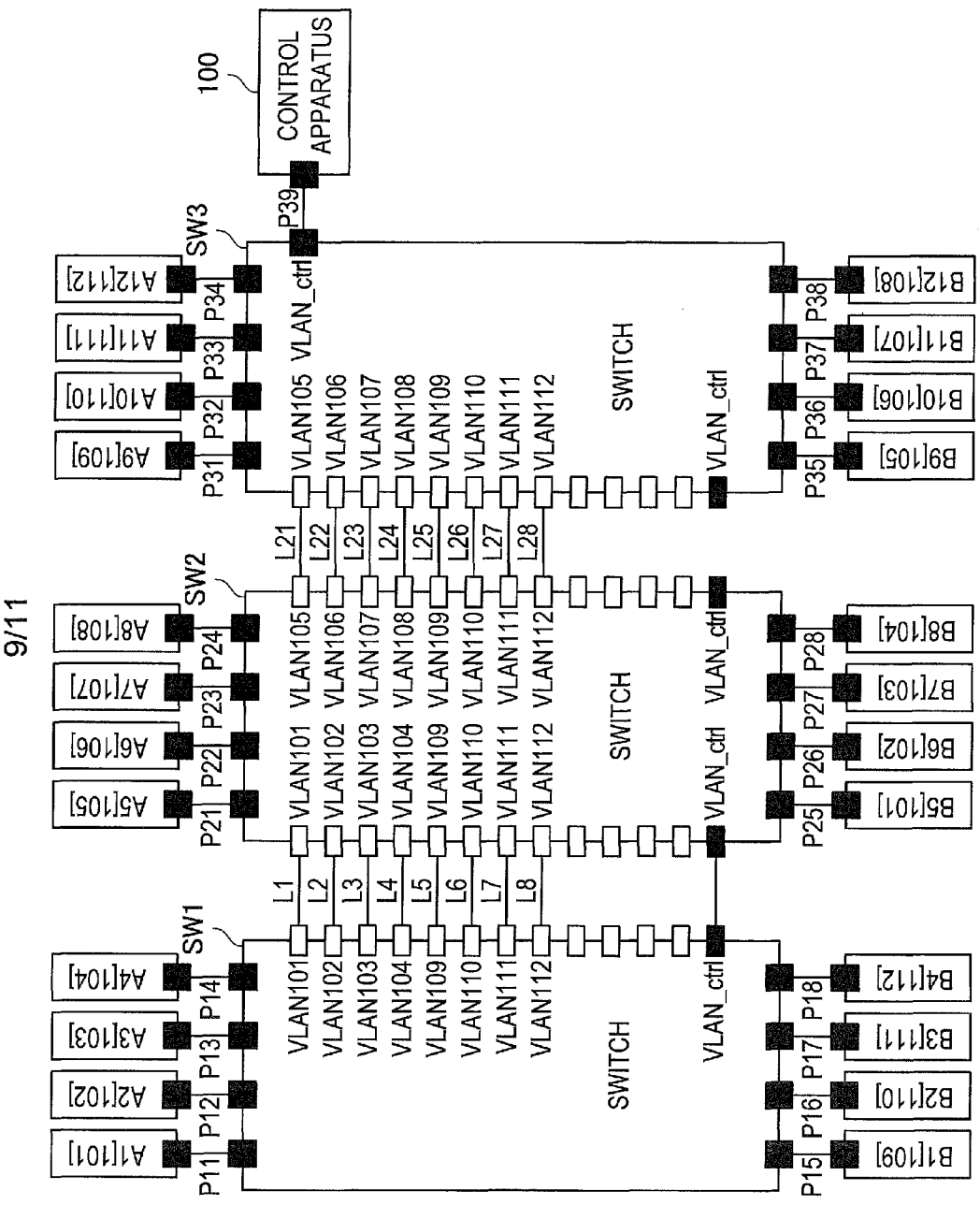
FIG. 11 is an explanatory diagram showing an example state in which final VLANs are assigned in the network according to an embodiment of the present disclosure.

FIG. 11 is an explanatory diagram showing an example state in which final VLANs are assigned in a network according to the present embodiment. Here, as one example network according to the present embodiment, similarly to the network shown in FIG. 9, FIG. 11 shows a network including the control apparatus 100, the network switches SW1, SW2, SW3, the nodes A1 to A12, and the nodes B1 to B12. Hereinafter, the nodes A1 to A12 and the nodes B1 to B12 may be collectively referred to as "end nodes".

In a state in which final VLANs are assigned as shown in FIG. 11, VLANs used for communication are assigned to the end nodes and the network switches. Here, FIG. 11 shows a state in which each provisional VLAN depicted in FIG. 9 is replaced by a final VLAN. That is, a provisional VLAN shown in FIG. 9 and a final VLAN shown in FIG. 11 have only a formal difference which is distinguished simply by VLAN number, naming, and a flag indicating provisional or final. Note that final VLAN according to the present embodiment is not limited the above-mentioned VLAN. For example, the case may occur where final VLANs according to the present embodiment partially replaces provisional VLANs depending on the conditions of generation of a cross-point.

Referring again to FIG. 5, example processing in the control method according to the present embodiment will be described. When the VLAN configuration is executed in step S120, the control apparatus according to the present embodiment terminates the processing in the control method according to the present embodiment.

The control apparatus according to the present embodiment performs, for example, the processing shown in FIG. 5 as the processing in the control method according to the present embodiment.

Note that the processing in the control method according to the present embodiment is not limited to the processing shown in FIG. 5.

For example, in the case where the VLAN configuration of a network switch is changed when the cross-point configuration generated in step S114 is executed, it is common to shut down the relevant ports of the network before the change. In the processing in the control method according to the present embodiment shown in FIG. 5 as one example, shutdown is released in order to monitor the connection state in a stage before the generation of the cross-point. Thus, in the processing in the control method according to the present embodiment shown in FIG. 5, for example in step S110, provisional VLANs, which are arranged so as not to form a loop, are assigned to make a change in the network configuration. For example, by performing the processing as described above, it is possible to determine, for example, whether or not connection between network switches to be monitored is available, by fault management processing (not shown) before the determination is used for generation of a cross-point. Also, by performing the processing as described above for example, when the connection between network switches is provisionally not available for example, it is possible to detect unavailable connection and reconfigure the network configuration before communication between relevant communication devices is attempted to be made.

On the other hand, as a processing method different from the processing in the control method according to the present embodiment shown in FIG. 5, the control apparatus according to the present embodiment may not release the shutdown, for example, until the generation of a cross-point and may continue the shutdown of the ports which are not used for generation of the cross-point. In the case where processing according to the above-mentioned different processing method is performed, for example when the relevant connection is provisionally not available, the control apparatus according to the present embodiment detects unavailable connection and reconfigures the network configuration in the fault management processing (not shown) at the moment when communication between relevant communication devices is attempted to be made. Also, in the case where processing according to the above-mentioned different processing method is performed, the control apparatus according to the present embodiment only sets provisional VLAN and does not execute the provisional VLAN, for example, in the processing of step S110 shown in FIG. 5.

Note that for example when the processing in the control method according to the present embodiment shown in FIG. 5 is performed, or processing according to the above-mentioned different processing method is performed, both the final VLANs and the provisional VLANs are to be set in the network switch in the processing of step S120 shown in FIG. 5. Consequently, this is advantageous in that unlike the method of continuing the shutdown, both VLANs can be constantly processed by the fault management processing after the processing of step S120 shown in FIG. 5 is performed, Control Apparatus According to Present Embodiment Hereinafter, an example configuration of a control apparatus according to the present embodiment will be described, the control apparatus being capable of performing the above-described processing in the control method according to the present embodiment.

Figure 12:
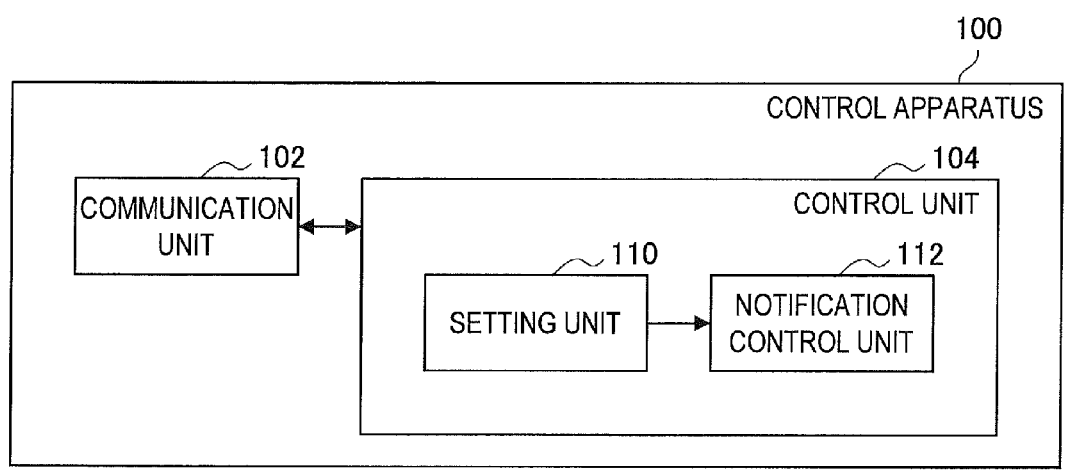
FIG. 12 is a block diagram showing an example configuration of a control apparatus according to an embodiment of the present disclosure.

FIG. 12 is a block diagram showing an example configuration of a control apparatus 100 according to the present embodiment. As one example, the control apparatus 100 includes a communication unit 102 and a control unit 104.

Also, as one example, the control apparatus 100 may include a ROM (Read Only Memory, not shown), a RAM (Random Access Memory, not shown), a storage unit (not shown), an operation unit that is operable by a user (not shown), and a display unit that displays various screens on a display screen (not shown). In the control apparatus 100, as one example the above-mentioned respective component elements are connected by a bus as a data transfer path.

Here, the ROM (not shown) stores programs, control data, such as computation parameters, and the like for use by the control unit 104. The RAM (not shown) temporarily stores a program to be executed by the control unit 104.

The storage unit (not shown) is a storage device included in the control apparatus 100, and as one example stores various data such as applications. Here, a magnetic recording medium such as a hard disk drive and a nonvolatile memory such as EEPROM (Electrically Erasable and Programmable Read Only Memory), flash memory can be given as examples of the storage unit (not shown). The storage unit (not shown) may be detachable from the control apparatus 100.

The operation device described later can be given as one example of the operation unit (not shown), and the display device described later can be given as one example of the display unit (not shown).

Example Hardware Configuration of Control Apparatus 100

Figure 13:
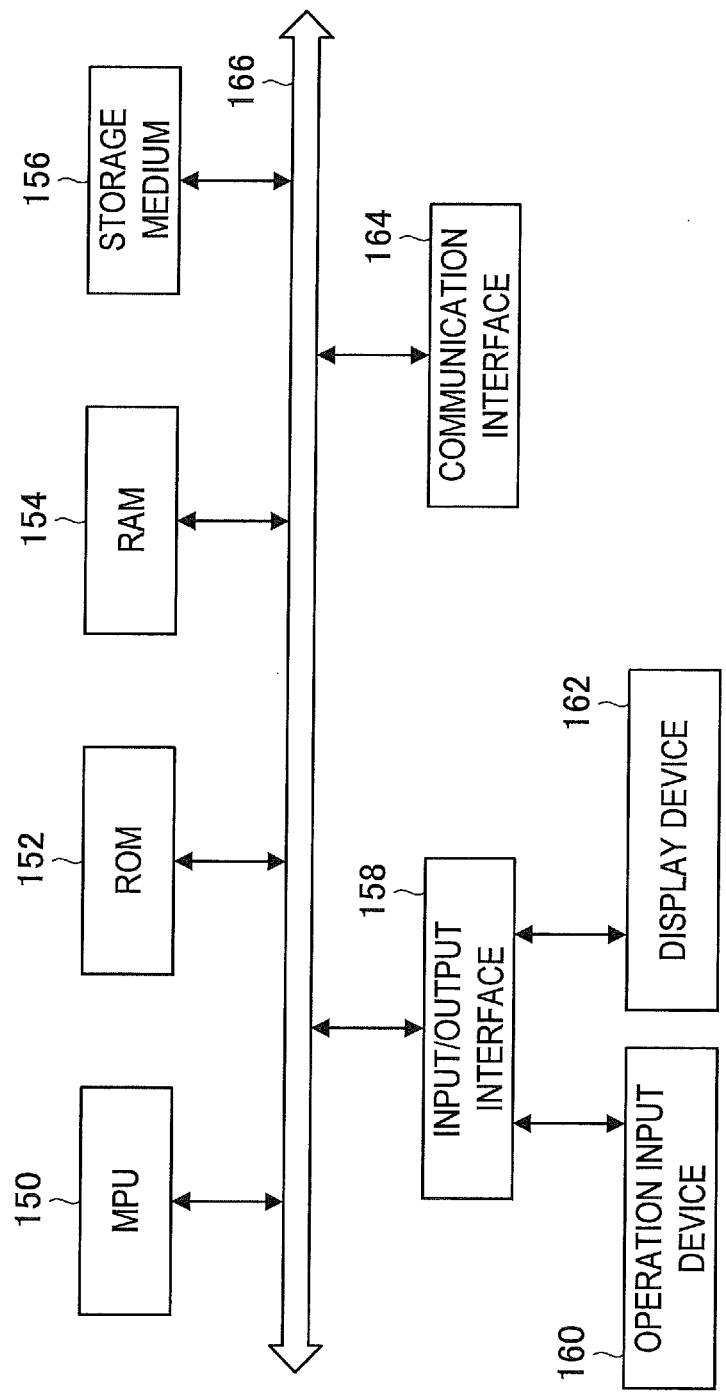
FIG. 13 is an explanatory diagram showing an example hardware configuration of the control apparatus according to an embodiment of the present disclosure.

FIG. 13 is an explanatory diagram showing an example hardware configuration of the control apparatus 100 according to the present embodiment. As one example, the control apparatus 100 includes an MPU 150, a ROM 152, a RAM 154, a storage medium 156, an input/output interface 158, an operation input device 160, a display device 162, and a communication interface 164. Also, in the control apparatus 100, as one example the respective component elements are connected by a bus 166 as a data transfer path.

The MPU 150 is composed for example of an MPU (Micro Processing Unit) or various types of processing circuits and functions as the control unit 104 that controls the entire control apparatus 100. In the control apparatus 100, as one example the MPU 150 also fulfills the role of the setting unit 110 and the notification control unit 112, described later.

The ROM 152 stores programs, control data, such as computation parameters, and the like for use by the MPU 150. The RAM 154 temporarily stores a program to be executed by the MPU 150, for example.

The storage medium 156 functions as a storage unit (not shown), and as one example stores various data such as applications. Here, a magnetic recording medium such as a hard disk drive and a nonvolatile memory such as flash memory can be given as examples of the storage medium 156. The storage medium 156 may be detachable from the control apparatus 100.

The input/output interface 158 connects the operation input device 160 and the display device 162, for example. The operation input device 160 functions as an operation unit (not shown), and the display device 162 functions as a display unit (not shown). Here, a USB (Universal Serial Bus) terminal, a DVI (Digital Visual Interface) terminal, an HDMI (High-Definition Multimedia Interface) terminal, various processing circuits and the like can be given as examples of the input/output interface 158. As one example, the operation input device 160 is provided on the control apparatus 100 and is connected to the input/output interface 158 inside the control apparatus 100. A button or buttons, direction keys, and a rotary selector such as a jog dial, or a combination of the same can be given as examples of the operation input device 160. Also, as one example, the display device 162 is provided on the control apparatus 100 and is connected to the input/output interface 158 inside the control apparatus 100. A liquid crystal display, an organic EL (electro-luminescence) display, and an OLED (Organic Light Emitting Diode) display can be given as examples of the display device 162.

Note that it should be obvious that the input/output interface 158 may also be capable of connecting to external devices, such as an operation input device (as examples, a keyboard and a mouse) and a display device, as external apparatuses for the control apparatus 100. The display device 162 may also be a device, such as a touch screen, that is capable of both displaying and user operations.

The communication interface 164 is a communication device included in the control apparatus 100 and functions as the communication unit 102 for communicating via a network (or directly) with an external apparatus such as a device (as one example, a communication device that fulfills the role of a network switch or a node) included in a network according to the present embodiment. Here, a LAN terminal and a transmission/reception circuit can be given as examples of the communication interface 164. Note that the communication interface 164 may be a communication device related to wireless communications, such as a communications antenna and an RF circuit, IEEE 802.15.1 port and a transmission/reception circuit, IEEE 802.11b port and a transmission/reception circuit, and the like.

The network according to the present embodiment has a communication device that fulfills the role of a plurality of network switches and a plurality of nodes, as shown in FIG. 2 as one example. Note that the network according to the present embodiment is not limited to have such a configuration in which the network switches as shown in FIG. 2 are connected in series. As one example, the network according to the present embodiment may adopt a configuration in which network switches are connected in parallel. A wired network such as a LAN can be given as one example of the network according to the present embodiment.

The control apparatus 100 performs the processing in the control method according to the present embodiment with the configuration shown in FIG. 13 as one example. Note that the hardware configuration of the control apparatus 100 according to the present embodiment is not limited to the configuration shown in FIG. 13.

As one example, the control apparatus 100 may include a plurality of communication interfaces in accordance with different communication systems or the same communication system.

Also, for example when communication is made with an external apparatus such as a display device according to the present embodiment via an external communication device which is connected via the input/output interface 158, the control apparatus 100 may not include the communication interface 164.

Also, as one example, the control apparatus 100 may adopt a configuration which does not include at least one of the storage medium 156, the operation input device 160, and the display device 162.

Referring again to FIG. 12, an example configuration of the control apparatus 100 will be described. The communication unit 102 is a communication device included in the control apparatus 100 and communicates via a network (or directly) with an external apparatus such as a device (as one example, a communication device that fulfills the role of a network switch or a node) included in a network according to the present embodiment. Also, in the communication unit 102, communication is controlled by the control unit 104, for example.

Here, a LAN terminal and a transmission/reception circuit can be given as examples of the communication unit 102.

The control unit 104 is composed for example of an MPU and fulfills the role of control of the entire control apparatus 100. Also, as one example, the control unit 104 includes a setting unit 110 and a notification control unit 112, and fulfills the role of initiatively performing the processing in the control method according to the present embodiment.

The setting unit 110 fulfills the role of initiatively performing set processing according to the present embodiment. As described with reference to FIG. 5 as one example, the setting unit 110 sets a network configuration by assigning a network connection to between each network switch and each node based on the disposition of the network switches and the nodes in a network according to the present embodiment.

Here, when a hierarchy is defined for each of the network switches disposed in a network according to the present embodiment as shown in FIG. 7 as one example, the setting unit 110 calculates the number of network connections to be assigned to nodes in ascending order of the hierarchy of the network switches, for example. The setting unit 110 then assigns a network connection to between each network switch and each node based on the calculated number of network connections, for example.

When a hierarchy is not defined for any network switch disposed in a network according to the present embodiment as shown in FIG. 8 as one example, the setting unit 110 calculates the number of network connections to be assigned to nodes sequentially starting from a network switch located at one end. The setting unit 110 then assigns a network connection to between each network switch and each node based on the calculated number of network connections, for example.

More specifically, as shown in steps S106 to S120 in FIG. 5 as one example, the setting unit 110 determines whether or not it is possible to assign network connection to between each network switch and each node using the number of network connections calculated for each network switch. The setting unit 110 then assigns network connection to between each network switch and each node, for example when assignment is possible.

Also, as shown in FIG. 5 as one example, before a network configuration is finalized, the setting unit 110 may set a network according to the network configuration as a provisional network (as one example, a provisional VLAN described above), and after the network configuration is finalized, the setting unit 110 may set a network according to the network configuration as a final network (as one example, a final VLAN described above).

The notification control unit 112 fulfills the role of initiatively performing notification processing according to the present embodiment, and as one example notifies a plurality of network switches and a plurality of nodes of the network configuration set in the setting unit 110. The notification control unit 112 transmits information (data) indicating the set network configuration via, for example, the communication unit 102 or an external communication device connected to the control apparatus 100, thereby notifying the plurality of network switches and the plurality of nodes of the set network configuration.

The control unit 104 fulfills the role of initiatively performing the processing in the control method according to the present embodiment due to the provision of the setting unit 110 and the notification control unit 112, for example.

The control apparatus 100 performs the processing (as examples, the above-mentioned set processing and the above-mentioned notification control processing) in the control method according to the present embodiment using the configuration shown in FIG. 12 as one example. Thus, the control apparatus 100 can achieve change in network configuration and reduction in consumption of network resources using the configuration shown in FIG. 12 as one example.

Also, the control apparatus 100 performs the processing in the control method according to the present embodiment, thereby making it possible to achieve a configuration in which unnecessary VLANs accompanied with the generation of a cross-point as shown with reference to FIGS. 2 and 3 as one example are removed beforehand. Therefore, the control apparatus 100 can reduce the consumption of switch resources by the provision of the configuration as shown in FIG. 12 as one example, and thus a network according to the present embodiment can be configured with a switch network with a smaller size.

Also, the control apparatus 100 performs the processing in the control method according to the present embodiment, thereby making it possible to generate connection information between nodes more efficiently as shown with reference to FIGS. 5 and 6 as one example, the connection information being used to achieve routing control and display function based on a structure according to a cross-point structure which is adopted in a routing switcher that handles image data (data indicating still image, dynamic image) or audio data.

Note that the configuration of a control apparatus according to the present embodiment is not limited to the configuration shown in FIG. 12.

As one example, the control apparatus according to the present embodiment may separately include one or both of the setting unit 110 and the notification control unit 112 shown in FIG. 12 (for example, one or both of the setting unit 110 and the notification control unit 112 is achieved by a processing circuit provided separately from the control unit 104).

Also, the control apparatus according to the present embodiment may not include the communication unit 102 for example when communicating via a connected external communication device with an external apparatus such as a device (as one example, a communication device that fulfills the role of a network switch or a node) included in the network according to the present embodiment.

So far, the control apparatus has been described as the present embodiment, however, the present embodiment is not limited to such an embodiment. The present embodiment is applicable to various electronic devices, for example, a computer such as a PC (Personal Computer) or a server, a video/music reproducing device (or video/music recording and reproducing device), and a game machine. The present embodiment is also applicable to a processing IC (Integrated Circuit) which can be incorporated in the above-mentioned electronic devices, for example.

Also, a network switch has been given and described as the present embodiment, however, the present embodiment is not limited to such an embodiment. The present embodiment is applicable to a communication device having a function of switching circuits or packets, the communication device being a switching hub, a Layer 2 switch, or a Layer 3 switch, for example.

Also, a node (a communication device that fulfills the role of a node) has been given and described as the present embodiment, however, the present embodiment is not limited to such an embodiment. The present embodiment is applicable to various electronic devices, for example, a computer such as a PC or a server, a video/music reproducing device (or video/music recording and reproducing device), a game machine, and a display device such as a television receiver.

Program According to Present Embodiment

Execution of a program (as one example, a program capable of executing the processing in the control method according to the present embodiment, such as the above-mentioned set processing and the above-mentioned notification control processing) by a computer makes it possible to achieve change in network configuration and reduction in consumption of network resources, the program causing the computer to function as the control apparatus according to the present embodiment. Also, execution of a program by a computer makes it possible to achieve the effects attainable by the control apparatus according to the above-described present embodiment, the program causing the computer to function as the control apparatus according to the present embodiment.

So far, the preferred embodiment of the present disclosure has been described in detail with reference to the accompanying drawings. However, the technical scope of the present disclosure is not limited to the above example. It is apparent that in the scope of technical idea described in the appended claims, various alterations and modifications may occur to persons of ordinary skill in the technical field of the present disclosure, and it should be understood that they will naturally come under the technical scope of the present disclosure.

For example, although the provision of a program (computer program) for causing a computer to function as the image processing apparatus according to the present embodiment has been described above, it is also possible to provide a recording medium storing such program according to an embodiment of the present disclosure.

The configurations described above are mere embodiments of the present disclosure and naturally belong to the technical scope of the present disclosure.

Additionally, the present application may also be configured as below.
(1) A control apparatus including:
  a setting unit configured to set a network configuration by assigning a network connection to between each of a plurality of network switches and each of a plurality of nodes based on disposition of the network switches and the nodes in a network having the network switches and the nodes; and
  a notification control unit configured to notify the network switches and the nodes of the set network configuration.
(2) The control apparatus according to (1),
  wherein a hierarchy is defined for each of the network switches disposed in the network, and
  wherein the setting unit calculates a number of network connections to be assigned to the nodes in each network switch in ascending order of the hierarchy of the network switch, and assigns a network connection to between each network switch and each node.
(3) The control apparatus according to (1),
  wherein the setting unit calculates a number of network connections to be assigned to the nodes in each network switch, sequentially starting from a network switch located at one end, and assigns a network connection to between each network switch and each node.
(4) The control apparatus according to (2) or (3),
  wherein the setting unit determines whether or not it is possible to assign a network connection to between each network switch and each node using the number of network connections calculated for each network switch, and
  wherein, when the assignment is possible, the setting unit assigns a network connection to between each network switch and each node.
(5) The control apparatus according to any one of (1) to (4),
  wherein the setting unit, before finalizing the network configuration, sets a network according to the network configuration as a provisional network, and
  the setting unit sets the network according to the network configuration as a final network after the network configuration is finalized.
(6) A control method including:
  setting a network configuration by assigning a network connection to between each of a plurality of network switches and each of a plurality of nodes based on disposition of the network switches and the nodes in a network having the network switches and the nodes; and
  informing notifying the network switches and the nodes of the set network configuration.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control apparatus comprising:
  a setting unit configured to set a network configuration by assigning a network connection between a plurality of network switches and a plurality of nodes based on disposition of the network switches and the nodes in a network having the network switches and the nodes; and
  a notification controller configured to notify the network switches and the nodes of the set network configuration;
  wherein a hierarchy is defined for each of the network switches disposed in the network,
  wherein the setting unit configured to select one of the network switches one by one, calculate, for each of the selected network switch:
    a number of network connections to be assigned between a number of network switches among network switches stored in the selected network switch in ascending order of a corresponding defined hierarchy of the selected network switch, a number of end nodes among the nodes stored in the selected network switch, and a number of ports stored in the selected network switch;

assign a network connection between each network switch and each node according to a connection information generated based on said calculation, transmit said assignments, wherein said transmitting comprises:

determining, based on the connection information, whether or not it is possible to perform said assignments without exceeding switching capacity of any of the network switches, transmitting, when assignment of the network connection between each network switch and each node is possible to perform said assignments without exceeding switching capacity of any of the network switches, said assignments to the plurality of network switches to be executed, and setting, when the assignment is not possible to perform said assignments without exceeding switching capacity of any of the network switches, a new network configuration and repeating said selecting, calculating, assigning and transmitting.

2. The control apparatus according to claim 1, wherein said determination comprises setting a network according to the network configuration as a provisional network before finalizing the network configuration, and and said executing comprises setting the network according to the network configuration as a final network after the network configuration is finalized.

3. A control method comprising:

setting, by a setting unit, a network configuration by assigning a network connection between a plurality of network switches and a plurality of nodes based on disposition of the network switches and the nodes in a network having the network switches and the nodes; and notifying the network switches and the nodes of the set network configuration;

wherein a hierarchy is defined for each of the network switches disposed in the network, wherein the setting unit is configured to select one of the network switches one by one, calculates, for each of the selected network switch:

a number of network connections to be assigned between a number of network switches among network switches stored in the selected network switch in ascending order of a corresponding defined hierarchy of the selected network switch, a number of end nodes among the nodes stored in the selected network switch, and a number of ports stored in the selected network switch;

assigns a network connection between each network switch and each node according to a connection information generated based on said calculation, and transmit said assignments, wherein said transmitting comprises:

determining, based on the connection information, whether or not it is possible to perform said assignments without exceeding switching capacity of any of the network switches, transmitting, when assignment of the network connection between each network switch and each node is possible to perform said assignments without exceeding switching capacity of any of the network switches, said assignments to the plurality of network switches to be executed, and, setting, when the assignment is not possible to perform said assignments without exceeding switching capacity of any of the network switches, a new network configuration and repeating said selecting, calculating, assigning and transmitting.

4. The control method according to claim 3, wherein said determination comprises setting a network according to the network configuration as a provisional network before finalizing the network configuration, and and said executing comprises setting the network according to the network configuration as a final network after the network configuration is finalized.

* * * * *